United States Patent [19]

Watanabe

[11] 4,404,606
[45] Sep. 13, 1983

[54] AUTOMATIC MUSIC SELECTING DEVICE FOR TAPE RECORDER

[75] Inventor: Hideo Watanabe, Tokyo, Japan

[73] Assignee: Pioneer Electronic Corporation, Tokyo, Japan

[21] Appl. No.: 259,624

[22] Filed: May 1, 1981

[30] Foreign Application Priority Data

May 1, 1980 [JP] Japan .............................. 55-61386[U]

[51] Int. Cl.³ ............................................ G11B 15/00
[52] U.S. Cl. ...................................... 360/105; 360/90
[58] Field of Search ................. 360/105, 106, 109, 75, 360/90; 242/206, 209, 186

[56] References Cited

U.S. PATENT DOCUMENTS 4,167,764 9/1979 Hanajima et al. .............. 360/105 X

Primary Examiner—John H. Wolff

Attorney, Agent, or Firm—Sughrue, Mion, Zinn, Macpeak & Seas

[57] ABSTRACT

A power assist type tape recorder including an automatic music selecting mechanism in which a head base can be stopped at a music selecting position between a stop position and a play position for automatically selecting recorded portions on a tape. A drive gear is coupled coaxially to a flywheel and a reduction gear having a cutaway portion is disposed adjacent the drive gear with the reduction gear being engageable with the drive gear and movable between a stop position and a play position. An eccentric cam mounted on the reduction gear abuts the rear end of a head base upon which is mounted a reproducing head. A music selection position stop mechanism including a music selecting plunger and a stop lever coupled to the plunger stop the head base at a music selection position.

10 Claims, 4 Drawing Figures

AUTOMATIC MUSIC SELECTING DEVICE FOR TAPE RECORDER

BACKGROUND OF THE INVENTION

The present invention relates to a tape recorder, more particularly to an automatic music selection or automatic tape leader feeding mechanism for a cassette tape recorder.

There have been previously provided two types of such automatic music selecting or tape leader feeding mechanisms for cassette tape recorders. In one type, an additional head for detecting a recording position on a tape is used. In the other type, a reproducing head is also used to perform the detecting function. In the former case, the provision of such a detecting head causes an increased production cost.

In the case where the reproducing head is also used therefor, the music selection mechanism operates as follows. When an operatonal switch of the cassette tape recorder is changed over from a play mode to a music selecting mode position, a head base on which the reproducing head is mounted is moved by about 1 mm to 1.5 mm rearwardly and the recording position is detected by the head, which is still in contact with the tape. At the same time, corresponding to the rearward movement of the head base, various mechanism such as a constant rate tape feeding mechanism, a reel drive, and a brake mechanism are inoperative whereas a fast forwarding and rewinding mechanism is operated so as to fast forward or rewind the tape.

In the above described prior art construction, it is very difficult to directly control the various mechanisms according to the head base movement of about 1 mm to 1.5 mm. Accordingly, in addition to a plunger for the play mode which serves to move the head base to the play position, a large capacity plunger producing the same torque as that of the play plunger is needed for controlling the above described various mechanisms. This leads to complexity of construction with an accompanying high cost. Also, a great amount of electric power is needed therefor.

Recently, there has been provided a cassette tape recorder having an electric mode operation mechanism in which a large capacity play plunger is dispensed with and, instead, a power assist mechanism is used. Such a mechanism will be more specifically described. In such a mechanism, a small capacity compact plunger of an energy-saving type is used to move the mechanical parts to a play position with only a small torque. A reduction gear having a cutaway portion, which is rotated when the compact plunger is activated by use of the same switched electric supply, is engaged with a drive gear fixed to a rotatable shaft coaxially with a flywheel. As a result, a high drive torque is obtained using gear reduction. The head base on which the reproducing head is mounted is advanced to the play position through a cam fixed coaxially with the reduction gear. When the electric supply to the compact plunger is stopped, the cam is returned to thereby move the head base back to the stop position.

With this construction, since the head base is driven using the drive gear, the motion thereof is limited to two types, namely, the head base can be moved from the play position to the stop position and vice versa. During these operations, the flywheel is always rotated. Therefore, it is impossible to stop the head base at the music selecting position between the stop position and the play position.

SUMMARY OF THE INVENTION

Accordingly, the present invention provides an improved tape recorder having a power assist mechanism overcoming these drawbacks. The invention specifically provides an automatic music selecting mechanism wherein, when a reduction gear is disengaged from a drive gear at its cutaway portion, a head base is stopped at a music selecting position by a music selection stopping mechanism, a reproducing head is in contact with the tape, mechanisms such as a brake mechanism are inoperative, and at the same time fast forwarding or rewinding of the tape is possible.

More specifically, the invention provides a power assist type tape recorder including an automatic music selecting device composed of a drive gear attached rigidly to a flywheel and mounted coaxially therewith and a reduction gear having a cutaway portion with the reduction gear being engageable with the drive gear and being movable between a stop position and a play position. An eccentric cam is mounted on the reduction gear abutting a head base upon which a reproducing head are mounted for detecting a recorded signal on a tape. A rotation control mechanism controls the rotational position of the reduction gear. A music selection position stopping mechanism composed of a music selecting plunger and a stop lever coupled to the plunger stop the head base at a music selecting position.

DESCRIPTION OF THE PREFERRED EMBODIMENTS

Figure 1:
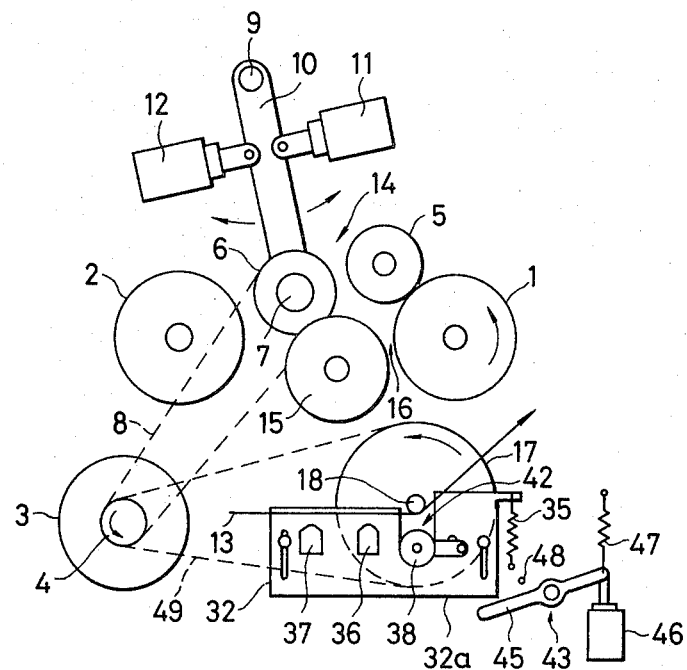
FIG. 1 is a schematic view of the construction of a tape recorder with an automatic music selecting device according to the present invention.
Figure 2:
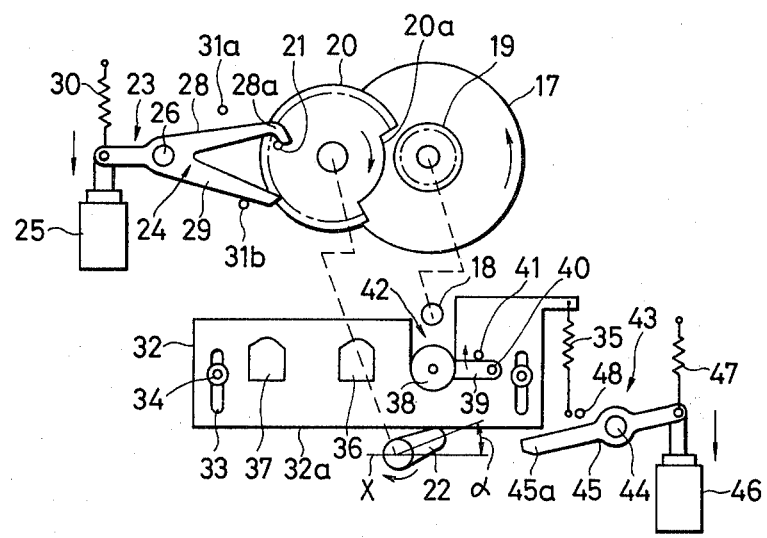
FIG. 2 is a top view illustrating an operation of a primary part of the device of FIG. 1.

The present invention will now be described with reference to the accompanying drawings. FIG. 1 is a schematic view showing a construction of a tape recorder with an automatic music selecting mechanism according to the present invention. FIG. 2 is a view similar to FIG. 1, illustrating an operation of a primary part of the tape recorder. In FIGS. 1 and 2, reference numeral 1 designates a winding reel disc, 2 a feed reel disc, 3 a motor, 4 a motor pulley fixed to an output shaft of the motor 3, 5 an intermediate idler which is always maintained in contact with the winding reel disc 1, and 6 a drive pulley to which a small pulley 7 is fixed coaxially therewith. A belt 8 passes around the drive pulley 6 and the motor pulley 4 to thereby transmit torque from the motor 3 to the pulley 6 therethrough. The drive pulley 6 is rotatably attached to a free end of an arm 10 which is pivoted at a shaft 9. The drive pulley 6 is alternately positionable in contact with the intermediate idler 5 and feed reel disc 2 by a fast forward plunger (solenoid) 11 coupled to the arm 10 and a rewinding plunger 12 also coupled thereto. A fast forward and rewinding mechanism 14 for a tape 13 is composed of the intermediate idler 5, the drive pulley 6, the fast forward plunger 11 and the rewinding plunger 12.

Reference numeral 15 denotes a winding idler which is frictionally engageable with the winding reel disc 1 or the small pulley 7. A reel drive mechanism 16 is composed of the three members 1, 7 and 15.

Reference numeral 17 denotes a flywheel to which rotational torque from the motor 3 is transmitted through a belt 49 which passes around the motor pulley 4. Any appropriate driving structure for this may be used, for example, an idler drive for the flywheel 17. Reference numeral 18 denotes a capstan fixed to the flywheel 17.

Reference numeral 19 denotes a small diameter drive gear fixed to the flywheel 17 coaxially therewith and 20 a large diameter reduction gear which is arranged to meshingly engage with the drive gear 19 but which has a cutaway portion 20a at its periphery. An upright pin 21 is fixed to an outer surface of the reduction gear 20 and an eccentrically-shaped cam 22 is fixed to the shaft of the reduction gear.

Reference numeral 23 denotes a rotation control mechanism for the reduction gear 20 including a stop lever 24 and an energy saving type compact play plunger 25. The stop lever 24 is pivotally mounted at its midpoint on a shaft 26 and is bifurcated from the shaft 26 on the right to thereby form two stop arms 28 and 29, one stop arm 28 having at its end a stop claw 28a. The other end of the stop lever 24 is coupled to the plunger 25. Reference numeral 30 denotes a stop spring for biasing the stop lever 24 clockwise and 31a and b denote stop pins for the stop lever 24.

Reference numeral 32 denotes a head base which is linearly movable guided by a guide groove 33 and a pin 34. Reference numeral 35 designates a spring for biasing the head base 32 toward the rear. A reproducing head 36 serves also as a recording head in the embodiment shown. The reproducing head 36, an erasing head 37 and a pinch roller 38 are mounted on the head base. Reference numeral 39 denotes a support arm for supporting rotatably the pinch roller 38 thereon. A spring force is applied to the support arm 39 by a spring (not shown) so that the pinch roller 38 is biased to rotate toward the front around a shaft 40. Reference numeral 41 denotes a stop pin for the arm 39. A constant speed drive mechanism 42 is composed of the pinch roller 38 and the capstan 18. The cam 22, provided coaxially with the reduction gear 20, is in contact with the rear edge 32a of the head base 32.

The relationship among the reduction gear 20, the cam 22 and the rotation control mechanism will now be described. First, in the stop condition as shown in FIG. 2, the stop lever 24 is stopped at the stop pin 31b by the spring force of the spring 20 whereas the other stop arm 28 is engaged with the pin 21 at the stop claw 28a so as to prevent the reduction gear 20 from rotating clockwise. At this time, the reduction gear 20 faces the drive gear 19 at the cutaway portion 20a and the cam 22 pushes the rear edge 32a of the head base 32 against the biasing force of the spring 35 with the cam being slanted by an angle of d with respect to a horizontal line X. In this case, the biasing force of the spring 30 is greater than that of the spring 35.

Figure 3:
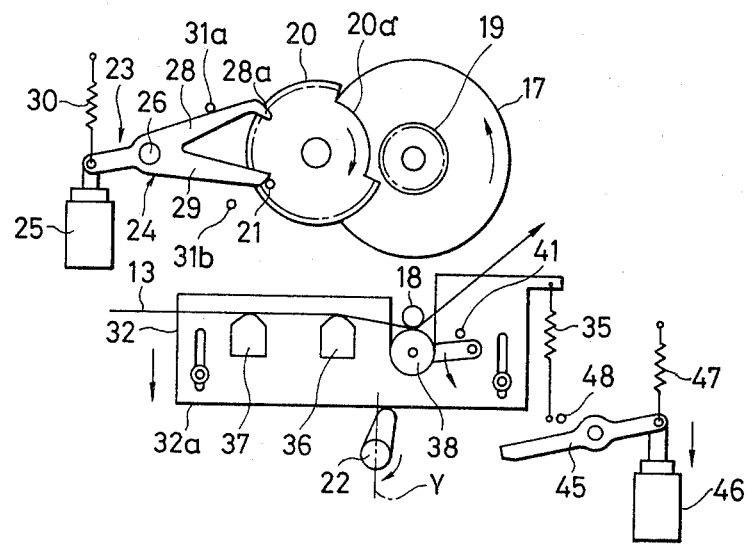
FIG. 3 is a top view illustrating an operation thereof in a play condition.

Subsequently, in the play mode, as shown in FIG. 3, by operation of the play plunger 25, the stop lever 24 is stopped at the stop pin 31a, the pin 21 is stopped so as to not to be rotated by the other stop arm 29, and the reduction gear 20 faces the drive gear 19 at its cutaway portion 20a. At this time, the cam 22 holds the head base 32 at the play position with the cam being slanted slightly from a vertical line Y toward the right. It it to be noted that the cam 22 must be slanted in any condition of stop and play on the right hand as described above. Thus, in changing from the stop mode to the play mode, a rotational torque is applied to the reduction gear 20.

Reference numeral 43 designates a selecting position stopping mechanism for the head base 32 composed of a stop lever 45 rotatable about a shaft 44, a compact music selecting plunger 46 coupled to an end of the lever 45, and a spring 47 for biasing the stop lever 45 clockwise. When the stop lever 45 is stopped by the stop pin 48, as the rear edge 32a of the head base 32 is in contact with the free end 45a of the lever 45, the head base is positioned at the selecting position.

The operation of the thus constructed device will now be described.

When the mode is changed from the stop mode shown in FIG. 2 to the play mode shown in FIG. 3, the play plunger 25 is operated so that the stop lever 24 is rotated counterclockwise against the force of the spring 30 about the shaft 26 and then is stopped in abutment with the stop pin 31a and simultaneously therewith disengages the stop claw 28a of the stop arm 28 from the pin 21 to thereby allow the reduction gear 20 to freely rotate. On the other hand, the cam 22 provided coaxially with the reduction gear 20 is pushed by the head base 32 moved rearwardly by the force of the spring 35 so that the cam 22 is rotated clockwise through an angle of α. By the rotation of the cam 22, the gear portion of the reduction gear 20 is engaged with the drive gear 19 coaxially fixed to the flywheel 17 so that the reduction gear 20 is rotated clockwise through one rotation. As a result, while the cam 22 is in contact with the rear edge 32a of the head base 32, the head base 32 is thereby advanced against the spring force of the spring 35. Then, when the end portion of the cam 22 is positioned slanted slightly from the vertical shaft Y toward the right, the cam 22 is moved downwardly by action of the spring 35. Accordingly, the reduction gear portion of the reduction gear 20 is disengaged from the drive gear 19 to allow the cutaway portion 20a to face the drive gear 19. At the same time, the pin 21 is in contact with the tip end of the stop arm 29 to thereby prevent rotation of the reduction gear 20. Thus, the head base 32 is stopped at the play position and the reproducing head 36 and the erasing head 37 are in contact with the tape 13. At the same time, the pinch roller 38 is in contact with the capstan 18 to thereby feed the tape 13 at a constant rate while, by the movement of the winding idler 15 into the space between the winding reel disc 1 and the small pulley 7 at a predetermined angle, the tape is wound on the reel.

Figure 4:
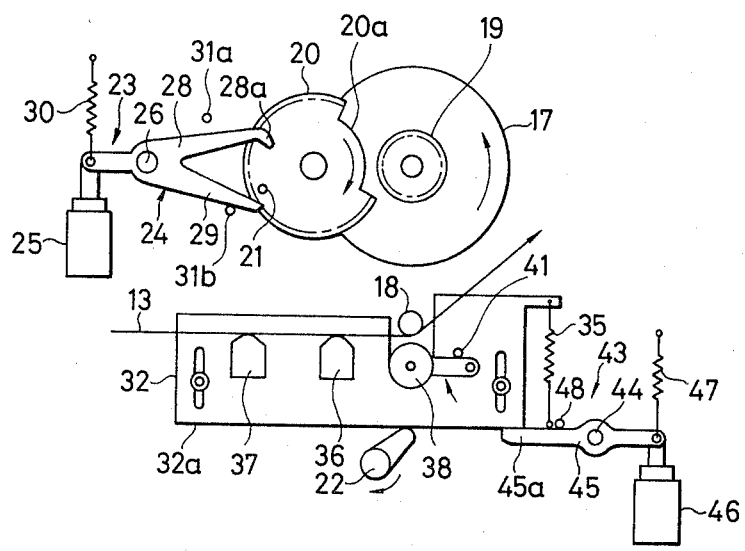
FIG. 4 is a top view illustrating an operation of the device of FIG. 1 in a music selecting condition.

Next, when the mode is changed over to the selecting condition (with reference to FIG. 4), the play plunger 25 is operated so that the mechanism is then in the play mode as described above. Immediately thereafter, the rotation control mechanism 23 is rendered inoperative in the stop condition while the music selecting position stopping mechanism 43 is operated so that the head base 32 is stopped at the selecting position. That is, immediately after reaching the play mode, the play plunger 25 is inoperative for the rotation control mechanism 23. Therefore the stop lever 24 is rotated clockwise by action of the spring 30 and stopped at the stop pin 31b whereas the pin 21 is disengaged from the stop arm 29 end to thereby allow the reduction gear 29 to freely rotate. Accordingly, the cam positioned at the stop position is rotated clockwise by the rearward movement of head base 32 due to the force of the spring 35 while at the same time rotation of the cam 22 allows the pin 21 to move toward the stop claw 28a of the stop lever 28. On the other hand, when the electric plunger 25 is stopped, the music selecting plunger 46 of the music selecting position stopping mechanism 43 is operated so that the stop lever 45 is rotated to stop at the stop pin 48 against the action of the spring 47. At this time, the head base 32 which is now moved toward the above described stop position is stopped at the music selection position so that the rear edge 32a of the head base 32 is in contact with the free end 45a of the stop lever 45. It should be noted that the rearward movement distance of the head base from the play position to the music selecting position is about 1 mm to 1.5 mm. In this state the reproducing head 36 is still in contact with the tape 13 and the pinch roller 38 is separated from the capstan 18. Therefore, the reel drive mechanism 16, the brake mechanism and the related components are rendered inoperative or released. When the fast forward and rewinding mechanism 14 is operated by the fast forward plunger 11 and the rewinding plunger 12, respectively, and the tape is run in the fast forword or rewinding mode, a signal recorded on the tape 13 is detected by the reproducing head 36 in response to which the electric supply to the music selecting plunger 46 is interrupted so that the stop lever 45 is rotated counterclockwise by the force of the spring 47. As a result, the head base 32 is moved rearwardly to the stop position by the spring 35 while at the same time the tape 13 is stopped by a non-signal portion between one music recorded portion on the tape and another adjacent thereto. At this time, electric power is supplied to the plunger 25 to start the play operation whereupon the signal recorded on the tape 13 is again reproduced.

As mentioned above, the power assist type tape recorder of the invention includes a drive gear 19 fixed to the flywheel 17 coaxially therewith, a reduction gear 20 having a cutaway portion 20a with the reduction gear 20 being engageable with the drive gear 19 and coaxially coupled to a cam 22 for moving between the stop condition and the play condition the head base 32 upon which is mounted the reproducing head 36 for detecting a recorded signal on the tape 13, and a rotation control mechanism 23 for controlling rotation of the reduction gear 20. The present invention futher includes a music selecting position stopping mechanism 43 coupled to a play plunger 46 and a stop lever 45 coupled to the plunger 46, whereby the head base 32 is stopped at a music selecting position by the stop lever 45. With this construction, it is possible to automatically select the recorded music on the tape with the power assist type recorder. Since a rotational torque only large enough to stop the head base 32 is required for the music selecting plunger 46, the tape recorder can be miniaturized.

What is claimed is:

1. An automatic music selecting device for a power assist type tape recorder comprising: a drive gear rotatable together with a flywheel; a reduction gear having a cutaway portion, said reduction gear being engageable with said drive gear; an eccentric cam mounted on said reduction gear for moving a head base between a stop position and a play position; said head base having a reproducing head mounted thereon for detecting a recorded signal on a tape as well as a pinch roller selectively engageable with a capstan, said eccentric cam abutting a rear side of said head base; a rotatation control mechanism for controlling a rotational position of said reduction gear; and a music selection position stopping mechanism for moving said head base to a music selection position at which said reproducing head is in contact with said tape and said pinch roller is disengaged from said capstan, said music selection position stopping mechanism comprising a music selecting plunger and a stop lever coupled to said plunger, said head base being stopped at said music selecting position by said stop lever.

2. The device of claim 1 wherein said stop lever is pivotally mounted at the center position thereof with a first end of said stop lever coupled to said music selecting plunger and a free second end of said stop lever being positioned to abut said rear side of said head base.

3. The device of claim 1 wherein said music selecting position stopping mechanism further comprises a first spring for biasing said stop lever so that said free end of said stop lever is urged to move in a direction toward said rear side of said head base.

4. The device of claim 1 or 2 further comprising a capstan coaxially coupled to said drive gear and a pinch roller rotatably mounted on said head base for engaging with said capstan in a play mode and being disengaged from said capstan in said stop position of said mechanism.

5. The device of claim 1 wherein said rotation control mechanism comprises a play plunger and a second stop lever, said second stop lever being rotatably mounted at a center position thereof and having a first end coupled to said play plunger and a bifurcated second end, said second end having first and second stop arms, and further comprising a first pin rigidly coupled to said reduction gear, wherein an inside portion of said first stop arm is in abutment with said first pin in said stop position.

6. The device of claim 5 further comprising second and third pins, said second pin being fixedly mounted at a position wherein an outer side of said second stop arm is in an abutment with said second pin when said first stop arm is in an abutment with said first pin and said third pin being rigidly mounted at a position wherein an outside portion of said first stop arm is in an abutment therewith in a play mode.

7. The device of claim 2 further comprising a spring for biasing said head base rearward, said spring biasing force rotating said eccentric cam after said rotation control mechanism is activated to prevent rotation of said reduction gear, said spring biasing force further urging said head base toward said free second end of said stop lever after said music selection position stopping mechanism is activated.

8. The device as claimed in claim 7 further comprising a stop for limiting movement of said free second end of said stop lever, said stop being positioned so that said spring moves said head base a small distance rearwardly from said play position.

9. The device as claimed in claim 8 wherein said small distance is between 1 mm and 1.5 mm.

10. An automatic music selecting device for a power assist type tape recorder comprising: a flywheel; a drive gear coaxially and rigidly mounted to said flywheel; a reduction gear having a cutaway portion therein with teeth of said reduction gear being engageable with teeth of said drive gear; a capstan coaxially and rigidly mounted on said drive gear; an eccentric cam rigidly mounted on said reduction gear; a play plunger; a first stop lever rotatably mounted at a center portion thereof having a first end coupled to said play plunger and having a bifurcated second end having first and second stop arms; a first pin rigidly coupled to said reduction gear, an inside portion of said stop arm abutting said first pin in a stop position; a second pin rigidly mounted at a position wherein an outside portion of said stop arm is in an abutment therewith in said stop position; a third pin rigidly mounted at a position wherein an outside portion of said first stop arm is in an abutment therewith in a play position; a head base linearaly slidably mounted to move toward and away from said capstan; an erase head and a reproducing head mounted on said head base; a pinch roller resiliently mounted on said head base at least partially within a cutaway portion therein, said eccentric cam abutting a rear side said head base at a position substantially to the rear of said pinch roller; a music selecting plunger; a second stop lever rotatably mounted at a center portion thereof having a first end coupled to said music selecting plunger and a free second end positioned to abut said rear side of said head base when said music selecting plunger is activated; a fourth pin rigidly mounted at a position to stop said free second end of said second stop lever at an engaging position at said rear of said head base; a first spring for urging said play plunger outwardly; a second spring for urging said music selecting plunger outwardly; and a third spring for urging said head base rearwardly.

* * * * *